Aug. 27, 1935.   C. P. SCHLEGEL   2,012,354
WINDOW CHANNEL
Filed March 11, 1933   2 Sheets-Sheet 1
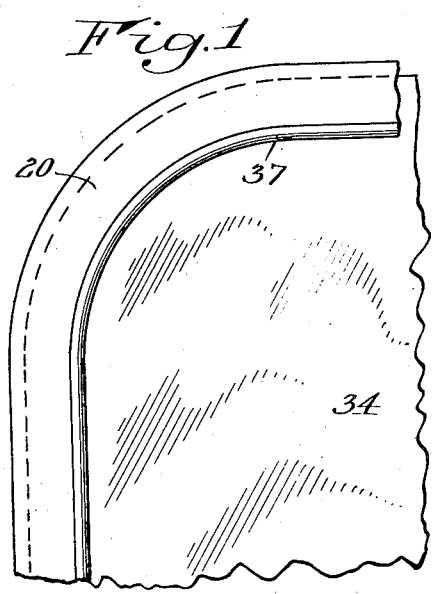
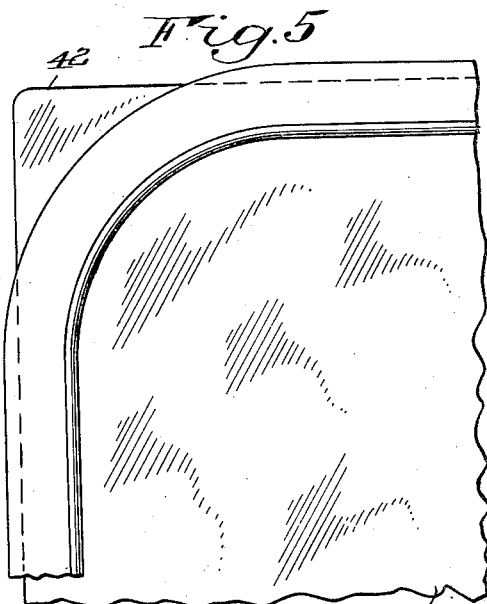
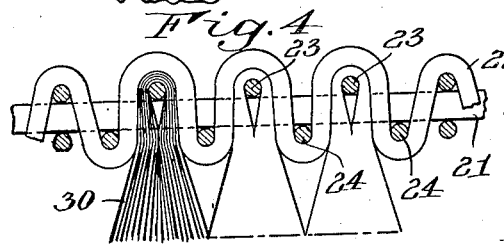
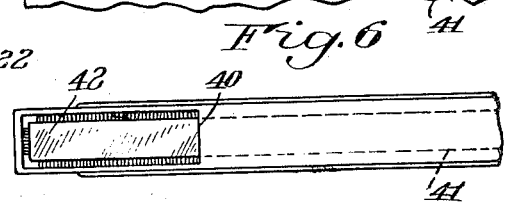
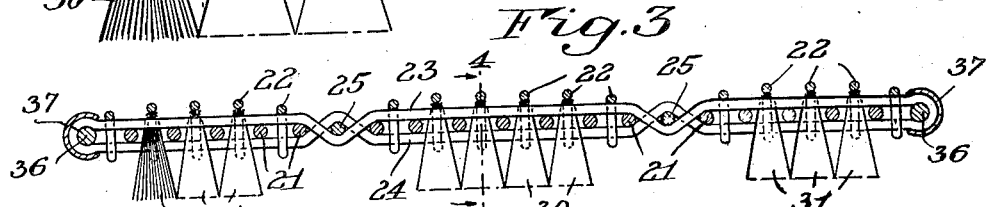
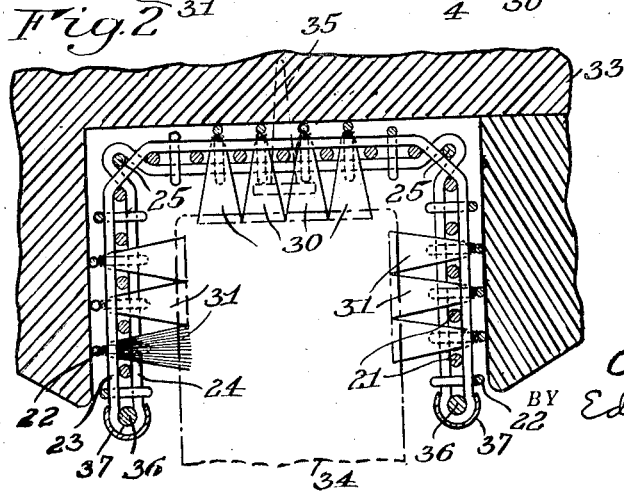
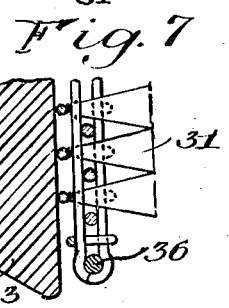
INVENTOR
Charles P. Schlegel
BY Edward H. Cumpston
his ATTORNEY Aug. 27, 1935.  C. P. SCHLEGEL  2,012,354
WINDOW CHANNEL
Filed March 11, 1933  2 Sheets-Sheet 2
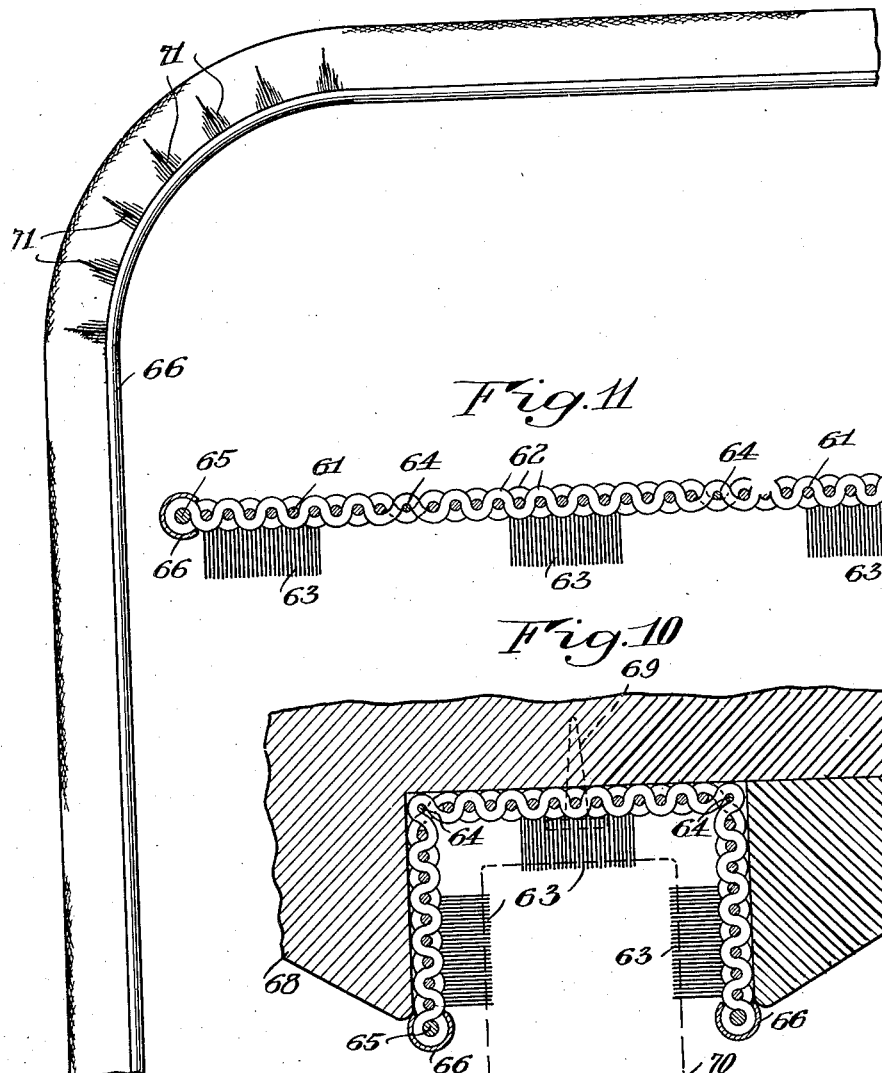
INVENTOR
Charles P. Schlegel
BY Edward H. Cumpston
his ATTORNEY Patented Aug. 27, 1935

2,012,354

UNITED STATES PATENT OFFICE 2,012,354

WINDOW CHANNEL

Charles P. Schlegel, Rochester, N. Y., assignor to The Schlegel Manufacturing Company, Rochester, N. Y., a corporation of New York Application March 11, 1933, Serial No. 660,402

REISSUED

17 Claims. (Cl. 296—44.5)

This invention relates to window channels such as are used, for example, as guideways or runways for movable windows of automobiles and other vehicles, or as supporting and mounting channels for set or immovable windows in aeroplanes and other vehicles.

An object of the invention is the provision of a generally improved and more satisfactory channel of this kind, which is easy and inexpensive to construct, easy to install, and effective in use.

Another object is the provision of a window channel which can be readily bent to any reasonable curvature in the plane of the glass embraced by the channel, so that it may be fitted easily around the corners of the window opening.

A further object is the provision of a channel having a body sufficiently stiff to be substantially self-supporting under normal conditions of use, while at the same time it may be flattened transversely substantially into a plane, for ease of packing and transportation.

A still further object is the provision, in such a channel, of a reinforcing and finishing member which will assist in holding the edges of the channel in position, which will furnish a decorative finish for one or both of the edges of the channel, and which will not interfere with easy bending of the channel to make it conform to corners of the window opening.

An additional object is the provision of a simple self-contained window channel ready for direct application to a vehicle body, which requires no filler or deadener between the channel and the vehicle body, and which may be bent readily into any shape desired.

To these and other ends the invention resides in certain improvements and combinations of parts, all as will be hereinafter more fully described, the novel features being pointed out in the claims at the end of the specification.

In the drawings:

Fig. 1 is a side elevation of a window channel constructed in accordance with a preferred embodiment of the invention, illustrating it bent around a corner of a pane of glass or the like;

Fig. 2 is a horizontal cross section on an enlarged scale of a window frame with the channel applied thereto, the parts being illustrated diagrammatically;

Fig. 3 is a diagrammatic transverse section through the window channel detached from the frame and flattened out substantially into a plane;

Fig. 4 is a diagrammatic view on a larger scale, taken longitudinally of the channel substantially on the section line 4—4 of Fig. 3;

Fig. 5 is a view similar to Fig. 1 showing a modified form of construction;

Fig. 6 is an edge view of the construction shown in Fig. 5;

Fig. 7 is a fragmentary transverse section similar to a portion of Fig. 2, illustrating a modification of the invention;

Fig. 8 is a view similar in general to Fig. 3, illustrating still another form of the invention;

Fig. 9 is a side elevation of a window channel constructed in accordance with another embodiment of the invention, illustrating it bent around a corner;

Fig. 10 is a horizontal diagrammatic cross section on an enlarged scale of a part of the window frame with the channel applied thereto, and Fig. 11 is a transverse section through the channel of Figs. 9 and 10 detached from the window frame and flattened out substantially into a plane.

The same reference numerals throughout the several views indicate the same parts.

This application is a continuation in part of my copending application for patent on a Window channel, Serial No. 643,073, filed November 17, 1932, which application, in turn, is a continuation in part of my copending application for patent on Window channels, Serial No. 494,348, filed November 8, 1930.

The channel of the present invention comprises a main body of material sufficiently stiff to be substantially self-supporting when placed in a window frame under normal conditions of use, but nevertheless sufficiently flexible so that it may be transversely flattened substantially into a plane for convenience of packing and transportation. The channel body is preferably of woven or textile material. It may be a heavy fabric woven from non-metallic fibers, or it may and preferably does include metallic filaments such as wires woven into the fabric to give it added stiffness without interfering with the necessary amount of flexibility.

In the embodiment illustrated in Figs. 1 to 4 inclusive, the channel comprises a main body woven from warp strands indicated diagrammatically at 21 and 22 and from weft strands indicated diagrammatically at 23 and 24. Any of these strands may be made, as desired, from either metallic or non-metallic material, so that part or all of the warp strands may be metallic and part or all of the weft strands may be metallic.

Preferably the warp strands 21 are of heavy cotton or linen and extend substantially straight along the material. Preferably the weft strands 23 and 24 are of metallic filaments such as wires, and part of the strands are placed in one plane and part of the strands in another plane spaced from and substantially parallel to the first plane. For example, the weft strands 23 run transversely or crosswise of the material in a plane just above the heavy warp strands 21 when viewed as in Fig. 3, and the other weft strands 24 run in the same direction in another plane just below the heavy warp strands 21. Preferably also the strands 23 and 24 alternate with each other as shown in Fig. 4, so that there will be first a strand 23 in the plane above the strand 21, then a strand 24 in the plane below, then another strand 23 in the plane above, and so forth. Obviously the arrangement of the strands may be altered as desired.

The other warp strands 22 are preferably likewise of non-metallic material such as cotton or linen, but may frequently be lighter than the strands 21, and are intertwined around the warp strands 23 and 24 as best shown in Fig. 4, passing above the upper or outer weft strands 23 and below the lower or inner weft strands 24, so that these strands 22 tend to hold the strands 23 and 24 against the strands 21 and tend to pull the weft strands in the spaced planes substantially into a single plane.

In order to form lines along which the body may be readily bent transversely into channel shape, the weft strands 23 and 24 preferably cross each other at points corresponding to the corners of the channel, as clearly shown in Figs. 2 and 3, and at such points the strands may be held in crossed relation by the corner warp strands 25, as indicated diagrammatically in the drawings.

The channel body is preferably provided with any suitable cushioning or lining means for supporting and cushioning the sash or glass embraced by the channel, and for providing a smooth runway for the glass if it is of the sliding or movable variety. This lining means may be formed of pile or any other suitable cushioning material, and may be formed as part of the channel body or as a separate piece or pieces secured to the channel body, as desired. Preferably the lining comprises strips of relatively long, stiff pile woven integrally with the channel body, the strips extending longitudinally along the inner surfaces of the side portions and of the back or bottom portion of the channel.

The pile on the bottom portion of the channel body is indicated diagrammatically at 30, while that on the side or wing portions is indicated diagrammatically at 31. The strips of pile 30 and 31 need not be the full width of the bottom or side portions of the channel, but may be relatively narrow strips occupying but a part of the width of those portions of the channel to which they are attached, as plainly shown in the drawings. The pile may be formed in any suitable or convenient manner. For example, the pile strands may be formed from a pile warp which is engaged around the upper or outer weft strands 23 and placed between them and the warp strands 22, as indicated diagrammatically in Fig. 4, for example.

It will be understood that in all of the figures of the drawings, the weaving is shown diagrammatically and that in the actual article, the strands are usually greater in number and closer together so that the parts are all held firmly in a manner well understood by those skilled in the art. It is also to be noted that the various details of weaving herein described, while preferred, are not to be taken in a limiting sense, and are mentioned as examples of satisfactory constructions. The details of the strands, the manner of weaving, and so forth, may be varied at will.

Fig. 2 illustrates the channel described above, as applied to a window frame 33 having a rabbet or groove therein in which the woven channel is placed and to which it is fastened as by tacks 35 driven at intervals through the back or bottom of the channel. The glass or sash supported by the channel is indicated at 34, and may be either fixed or movable along the channel, as desired. As above stated, the woven channel of the present invention, while sufficiently flexible to be bent up into channel form or flattened transversely substantially into a plane, is nevertheless sufficiently stiff to be substantially self-supporting in use. By this is meant that when the channel is bent into channel shape and placed in the groove of the frame 33 and attached to the frame as above indicated, it will maintain its shape and the side walls will stay in proper position in an effective manner without collapsing inwardly and without the necessity of fastening the side walls themselves directly to the frame 33. Thus it is not necessary to employ a sheet metal channel encasing and holding the woven channel, as is done according to some prior constructions. It is noted also that due to the woven construction, tacks or other fastening means may be driven through the channel member at any desired point, and it is not necessary to provide preformed apertures for the fastening means to pass through.

Preferably the channel construction includes means running longitudinally along one or both edges of the channel to reinforce the edges and to provide a more decorative finish or appearance for the edges. To this end, the channel is provided with enlargements running longitudinally along one or both edges, which may be formed by warp strands 36 at the edges of the channel member which are enlarged, that is, formed of cords or wires of somewhat larger size or diameter than the other warp strands such as 21. These strands 36 are preferably woven right into the material and surrounded at least to a substantial extent by the weft strands. The strands 36 may themselves form reinforcing members (especially if made of wire or the like), or preferably one or both of these enlarged edges are embraced by the reinforcing and finishing member 37 in the form of a hollow member or bead of sheet material open at one side as shown in the drawings. This member 37 may be formed of any suitable material, such as metal, celluloid, composition, or the like. In practice, it is found that a thin sheet of metal is satisfactory for forming the bead.

It is to be noted that the bead 37 is sufficiently strong so that it assists in holding the edge of the channel true and straight, but at the same time it is of such small dimensions transversely that the entire channel may readily be bent transversely or in the plane of a window embraced by the channel, by the application of slight force, as by hand.

The bead 37 embraces the enlargement at the edge of the woven channel body sufficiently tightly to be held thereby against transverse displacement, yet at the same time it is sufficiently loose on the channel body so that the bead may slide longitudinally along the body when the body is bent in a curve in the plane of the glass, as illustrated in Fig. 1. Such longitudinal sliding occurs during the bending operation, to compensate for the difference in length between the bead and the outer edge or back of the channel when thus bent.

When some or all of the weft strands of the channel are of wire, as above described, the weave of the channel body is preferably sufficiently loose so that this bending in the plane of the glass may take place readily. That is to say, the weft strands are preferably spaced slightly from each other, so that the weft strands in the side portions of the bent section of the channel may move closer to each other and converge toward the center of curvature, with the result that these side portions bend smoothly and substantially without puckering.

As above set forth, the reinforcing and finishing bead 37 may be applied to one or both of the edges of the channel, being shown on both edges in Fig. 2 of the drawings. When such a bead is used, the edge of the channel may project slightly beyond the edge of the window casing or frame 33, as shown in Fig. 2, so that the bead 37 may be visible and will lend its decorative effect to the trim of the vehicle. It will be apparent that the beads 37 may be made in various forms, styles, colors and finishes, as desired.

When a less expensive channel construction is desired, or whenever preferred for other reasons, the beads 37 may be entirely omitted, such a construction being illustrated in Fig. 7. When no finishing bead is employed, the edge of the window frame 33 preferably projects slightly beyond the edge of the channel member so that the channel member is largely hidden in the groove or rabbet of the window frame, although it may project into view if preferred.

The pile 31 at the sides of the channel is preferably sufficiently long and stiff so that it holds the sash or glass 34 spaced from the beads 37, or from the enlargements at the edges of the channel if no beads are used. Thus, if the glass is movable, it slides smoothly on the pile alone, and remains out of contact with the beads or enlargements.

A slight variation on the construction above described is illustrated in Figs. 5 and 6 of the drawings, in which a portion of the bottom or back of the channel member is cut away or apertured as indicated at 40, where the channel is curved or bent around the corner. This aperture permits the edge of the window pane or sash 41 to project out through the aperture as indicated at 42. Thus, for example, the window opening in the side of the vehicle may have rounded corners and the channel body may be conformed to this rounded configuration as illustrated in Fig. 5, while at the same time the glass or sash itself may have square or substantially square corners which thus project through the aperture 40 without interference.

In Fig. 8 of the drawings there is shown a slightly different embodiment of the invention in which the weft strands of wires or metallic filaments do not extend entirely across the transverse dimension of the channel, but only through part of the width of the channel. For example, in this construction, the weft strands 50 may be of metallic filaments or wires, and may extend inwardly from the enlarged warp strands 51 to certain other warp strands 52. Other weft strands 53, of cotton or linen or other suitable non-metallic material, may furnish the weft in the central part of the channel, between the two warp strands 52. The other warp strands 54 and 55 may be substantially the same as the warp strands 21 and 22, respectively, previously described, and the pile 56 and 57 may be placed and held in the same manner above described in connection with the pile 30 and 31. When the channel is formed or bent up from the flat form illustrated in Fig. 8 to the channel shaped cross section for use, the bends at the corners of the channel may come substantially at the warp strands 52 or at any other desired points.

With this construction, it is seen that metallic strands 50 are used in the side portions or wings of the channel, to stiffen these side portions and cause them to hold their shape properly in use, but that the bottom or back portion of the channel may have few wires or none at all woven in it, thus reducing the amount of wire in the channel while still maintaining the side portions with satisfactory stiffness.

In this embodiment of the invention, as in the embodiments previously described, reinforcing and finishing beads 58 may be employed on one or both edges if desired.

Still another embodiment of the invention is illustrated in Figs. 9 to 11 inclusive of the drawings, to which reference is now made. Here the main body of the channel is woven entirely or substantially entirely from non-metallic textile material such as cotton, linen, or the like, and contains little or no metallic strands or fibres. The warp strands are indicated diagrammatically at 61, and the weft strands at 62, the pile for supporting and cushioning the window sash being held in any suitable manner and indicated diagrammatically at 63. Weakened lines may be formed longitudinally of the channel member at points corresponding to the corners of the channel for easy bending, which weakened lines, for example, may be formed by spacing the warp strands slightly farther away from each other along the corners and by using one or more slightly smaller warp strands 64 at the corners.

As before, the warp strands 65 at the edges of the channel may be enlarged, and the enlarged edges of the channel may be embraced by beads 66 similar to the beads 37 previously described, if desired.

As shown in Fig. 10, such a channel may be placed in a rabbet or groove in a window frame 68, and held therein in any suitable manner, such as by tacks or nails 69 driven at intervals through the base or back of the body portion, and the pile 63 serves to support and cushion a window sash or pane 70 which may be either fixed or movable as desired.

This form of channel, like the previous forms, may be readily bent through a curve in the plane of the glass, as illustrated in Fig. 9. The beads 66, if used, slide longitudinally to a slight extent along the edge of the channel during the bending operation, so as to compensate for the difference in length between the inner and outer edges of the bent portion of the channel, and the side walls of the channel may pucker somewhat as indicated at 71, to accommodate themselves to the curved shape.

When such a channel is made of relatively heavy and tightly woven textile material mainly or entirely of non-metallic strands, it is found in actual practice to be sufficiently stiff so that it is satisfactory and self-supporting in use, but nevertheless sufficiently flexible so that it may be readily flattened out transversely substantially into a plane, as shown in Fig. 11, for convenience of packing and shipping. Even when no reinforcing wires or metallic filaments are used, the sides of such a channel of relatively tightly woven non-metallic textile material, will remain in place and hold their proper shape satisfactorily under normal conditions of use, as described above in connection with the other embodiments of the invention, especially when the edges are reinforced by the beads 66.

It will be seen that all of the various embodiments of the invention above described comprise channel members of which the main body portion is of woven or textile material or fabric, sufficiently flexible to be flattened substantially into a plane, and yet sufficiently stiff to be substantially self-supporting when placed in the window frame under normal conditions of use as above described, and without the necessity of employing a sheet metal embracing channel or similar holding means for maintaining the sides of the woven channel in place. The stiffness of the sides of the channels of the present invention is sufficient so that sliding movements of the glass or sash will not displace the sides of the channels or cause them to buckle or bulge. At the same time, the channels may be easily bent, as by hand for example, to any desired shape, so that they may be readily and quickly applied to window openings of any shape or size, and need not be specially shaped or formed at the factory for each different size or shape of window opening.

Furthermore, it is pointed out that the window channels of the present invention require no deadening material or filler between the channel and the vehicle frame. The woven channel body itself acts as a sufficient deadener even when placed in contact with metal frame parts. In the preferred form of construction, the non-metallic warp strands 22 are principally in contact with the vehicle frame and keep the metallic strands 23 and 24 largely out of contact with the frame, so that there is little or no metal-to-metal contact between the window channel and any metallic frame parts. Thus there is provided, in the preferred form, an extremely simple, self-contained, ready-to-apply channel which is highly satisfactory in use, and which is light and small.

It is to be understood that the terms "fabric" and "textile fabric" and "textile material" and "woven material" as used in this specification and in the accompanying claims, are not intended to be limited to fabric or material woven from non-metallic strands, but are intended to be interpreted broadly to include material in which some or all of the strands are of wire or metallic filaments, as well as material in which some or all of the strands are of animal or vegetable fibers.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A window channel comprising a textile body including non-metallic strands and metallic strands interwoven with said non-metallic strands to impart stiffness to said body and render it substantially self-supporting under normal conditions of use.

2. A window channel comprising a woven body having a plurality of weft strands of metallic filaments and a plurality of warp strands of non-metallic textile material.

3. A window channel comprising a main body of textile material including metallic strands woven into the body and extending transversely of the body to lend stiffness thereto, so that said main body of the channel may be substantially self-supporting under normal conditions of use.

4. A substantially self-supporting window channel comprising a main body of textile material including normal warp strands and also a warp strand of larger than normal size running substantially along an edge of the body, and weft strands including a plurality of metallic filaments.

5. A window channel comprising a main body of textile material including normal warp strands and also a warp strand of larger than normal size running substantially along an edge of the body, weft strands including a plurality of metallic filaments, and a hollow bead running longitudinally along an edge of said body and embracing said larger warp strand and retained thereby against transverse displacement.

6. A woven window channel having enlarged warp strands at opposite edges, and metallic reinforcing strips enclosing those portions of the channel that enclose said warp strands.

7. A window channel comprising a single channel shaped body of fabric having an enlargement running substantially continuously along each edge, and a reinforcing and finishing member of relatively rigid material embracing each enlargement and running longitudinally along the enlargement to reinforce and finish the edge of the channel, said finishing members being capable of sliding longitudinally along said enlargement so that said body and said finishing members may be bent readily in the plane of a window embraced by the channel.

8. A window channel comprising a channel shaped member of textile material having woven in it a relatively large strand running substantially along one edge of the channel, and a reinforcing and finishing bead of relatively rigid material running along said edge and embracing said strand and retained thereby against transverse displacement.

9. A window channel comprising a channel shaped member of textile material having woven in it a relatively large strand running substantially along one edge of the channel, and a metallic reinforcing and finishing bead running along said edge and embracing said strand and movable longitudinally with respect to the strand so that the channel may be bent readily in the plane of a window embraced by the channel.

10. A window channel comprising a main channel shaped body of fabric sufficiently stiff to be substantially self supporting in use but capable of being flattened transversely substantially into a plane, and a reinforcing and finishing member of relatively rigid material embracing an edge of said body and slidable longitudinally with respect to the body so that the body and member may be bent readily in the plane of a window embraced by the channel.

11. A window channel comprising a main channeled shaped body of non-metallic flexible material sufficiently stiff to be substantially self supporting in use, an enlargement substantially at one edge of said body, and a reinforcing and finishing member of relatively rigid material embracing said enlargement and running longitudinally along an edge of said body, said reinforcing and finishing member being slidable longitudinally with respect to said body so that the body and member may be bent readily in the plane of a window embraced by the channel.

12. A window channel formed by a substantially U-shaped textile body of metallic and non-metallic strands interwoven with each other comprising transversely extending metal wire weft strands for reinforcing and supporting the side walls of the channel and textile coverings for the inner faces of said side walls woven to provide soft pads of substantial thickness for cushioning engagement with the sides of the window, said channel being readily flexible in the plane of a window embraced thereby.

13. A window channel formed by a substantially U-shaped body of integrally interwoven strands comprising transversely extending metal wire strands for reinforcing and supporting the side walls of the channel and textile fiber strands interwoven with and sheathing said wire strands, said fiber strands being woven to provide soft pads of substantial thickness on the inner faces of said side walls for cushioning engagement with the sides of the window, said channel being readily flexible in the plane of a window embraced thereby.

14. A window channel formed by a substantially U-shaped body of integrally interwoven strands comprising transversely extending metal wire strands for reinforcing and supporting the side walls of the channel and textile fiber strands interwoven with said wire strands to provide soft pads of substantial thickness on the inner faces of said walls for cushioning engagement with the sides of the window, said side walls having enlarged edge portions, and flexible, hollow beads embracing and supporting said edge portions, said channel being readily flexible in the plane of a window embraced thereby.

15. A window supporting channel for insertion in the rabbet of a window frame comprising a substantially U-shaped textile body of interwoven weft and warp strands including metallic and non-metallic strands interwoven with each other, the side walls of said channel body being relatively stiff and self-supporting in use, said body being capable of being readily curved in the plane of the window to fit a curved line of a window frame and also of being laid flat in the plane of the intermediate or base portion of said channel body, and textile coverings for the faces of said side walls woven to provide soft pads of substantial thickness for cushioning engagement with the sides of a window supported by said channel.

16. A window channel formed by a substantially U-shaped body of material comprising transversely extending metal wire strands for reinforcing and supporting the side walls of the channel and longitudinally extending non-metallic strands interwoven with said wire strands, and padding material of substantial thickness on the faces of said side walls for cushioning engagement with the sides of the window, said channel being readily flexible in a transverse direction to fit the curved outline of a window embraced thereby.

17. A window channel for insertion in a rabbet of a window frame, comprising a woven textile body including transverse strands sufficiently stiff to hold said body in proper channel shape when in normal position within said rabbet, and longitudinal strands crossing and interwoven with said transverse strands and sufficiently flexible so that said body may be readily bent to a curve in the plane of a window to be embraced by said channel, certain of said strands being non-metallic.

CHARLES P. SCHLEGEL.